United States Patent
Suk et al.

(10) Patent No.: US 9,618,380 B2
(45) Date of Patent: Apr. 11, 2017

(54) SENSOR FOR MEASURING WATER LEVELS OF GROUNDWATER AND SURFACE WATER USING MAGNETOSTRICTION DISPLACEMENT AND MULTI MEASUREMENT SYSTEM FOR GROUNDWATER AND SURFACE WATER BY USING THE SAME

(71) Applicant: KOREA INSTITUTE OF GEOSCIENCE AND MINERAL RESOURCES (KIGAM), Daejeon (KR)

(72) Inventors: Heejun Suk, Daejeon (KR); Dong-Chan Koh, Daejeon (KR); Jang-Hee Han, Kyunggi (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 220 days.

(21) Appl. No.: 14/597,373

(22) Filed: Jan. 15, 2015

(65) Prior Publication Data
US 2016/0123790 A1    May 5, 2016

(30) Foreign Application Priority Data
Nov. 4, 2014    (KR) .......................... 10-2014-0151996

(51) Int. Cl.
*G01F 23/72* (2006.01)
*G01V 1/02* (2006.01)

(52) U.S. Cl.
CPC .............. *G01F 23/72* (2013.01); *G01V 1/159* (2013.01)

(58) Field of Classification Search
CPC .................................. G01F 23/72; G01V 1/159
(Continued)

(56) References Cited

U.S. PATENT DOCUMENTS

| 2012/0229623 A1* | 9/2012 | Hsieh | G01V 1/008 348/135 |
| 2013/0197810 A1* | 8/2013 | Haas | G01V 9/00 702/12 |
| 2015/0114104 A1* | 4/2015 | Claverie, III | G01F 23/284 73/290 V |

FOREIGN PATENT DOCUMENTS

| JP | 2003097749 A | * | 4/2003 |
| KR | 20010091727 A | | 10/2001 |

(Continued)

*Primary Examiner* — Walter L Lindsay, Jr.
*Assistant Examiner* — Philip Marcus T Fadul
(74) *Attorney, Agent, or Firm* — Ladas & Parry LLP

(57) ABSTRACT

Provided is a sensor for measuring water levels of groundwater and surface water using magnetostriction displacement and multi measurement system for groundwater and surface water by using the same. The sensor includes an outer case having a hollow space therein and extending in a longitudinal direction, a magnetostriction line spaced apart from an inner wall in the hollow space of the outer case to extend in the longitudinal direction, a floating permanent magnet guided along the magnetostriction line to be movable in the longitudinal direction, the floating permanent magnet being changed in position to correspond to a water level; and a transceiver applying a current pulse into the magnetostriction line to receive an elastic wave that is generated while first magnetic fields formed in a circumferential direction of the magnetostriction line by the current pulse crosses a second magnetic fields formed in an axial direction of the magnetostriction line by the permanent magnet.

4 Claims, 6 Drawing Sheets

(58) Field of Classification Search
USPC .......................................................... 73/313
See application file for complete search history.

(56) References Cited

FOREIGN PATENT DOCUMENTS

| KR | 20130106559 A | 9/2013 |
| KR | 20130106560 A | 9/2013 |

* cited by examiner (a)

(b)

SENSOR FOR MEASURING WATER LEVELS OF GROUNDWATER AND SURFACE WATER USING MAGNETOSTRICTION DISPLACEMENT AND MULTI MEASUREMENT SYSTEM FOR GROUNDWATER AND SURFACE WATER BY USING THE SAME

CROSS-REFERENCE TO RELATED APPLICATIONS

This U.S. non-provisional patent application claims priority under 35 U.S.C. §119 of Korean Patent Application No. 10-2014-0151996, filed on Nov. 4, 2014, the entire contents of which are hereby incorporated by reference.

BACKGROUND OF THE INVENTION

The present invention disclosed herein relates to an apparatus and system for measuring a water level by using magnetostriction displacement.

The hydrologic cycle is called the continuous movement of water on, above, and below the surface of the earth. The water on the surface of the earth, i.e., surface water, exists in a stream, lake, wetland, gulf, and ocean. Also, the surface water may exist in snow and glacier states. Water existing under the surface of the earth is called groundwater. Here, soil water is included in the groundwater. However, although water movements in air and on the surface of the earth are easily patterned, it is very difficult to pattern movement of the groundwater. The groundwater flows from a recharge area to a discharge area along different paths. Generally, a flow of the groundwater starts from a groundwater table to flow along a groundwater system and is finished at a pumping well. Rainfall infiltrates into the ground through an unsaturated zone to recharge the groundwater. A flow path of an unconfined aquifer that is the uppermost portion of an aquifer has a length of several tens to several hundreds fts. The water introduced into the unconfined aquifer flows for several days to several years.

In one environment, a gaining stream and losing stream are continuous. That is, one stream may always receive the groundwater from the groundwater system, and the other stream may always supply the water into the groundwater system. In the other environment, the losing stream and the gaining stream may change along the stream according to areas. Furthermore, the gaining stream and the losing stream may be alternately generated according to transpiration of the groundwater due to focused recharge, temporary flood, and plants around the stream. In other words, the groundwater system may complicatedly interact with the surface water system all the time.

There is a phenomenon that is called bank storage as interaction between the groundwater and the surface water in almost all streams. The bank storage is a phenomenon in which a water level of the stream rapidly increases to get higher than that of the groundwater therearound, thereby allowing the stream water to flow to and be stored in a riverbank. The bank storage may occur when it rains suddenly, when snow melts very fast, or when water is suddenly introduced from an upstream reservoir. In this case, if a water level of the stream does not continuously increases, the water stored in the riverbank returns within several days to several weeks. If the water level of the stream floods over the riverbank, wide groundwater recharge may be generated over the whole areas. Like this, when the groundwater recharge is generated due to the flood, it takes several weeks, months, or years until the water returns to the stream.

Therefore, it is necessary to develop a sensor for accurately measuring the water level of the surface water and the groundwater and a system for monitoring the interrelation therebetween.

The inventor has completed the present invention based on the findings so as to solve the above-described limitations.

SUMMARY OF THE INVENTION

The present invention provides a sensor that is capable of measuring a water level of surface water or groundwater.

The present invention also provides a multi sensor that is capable of simultaneously measuring a water level of each of surface water and groundwater.

The present invention also provides a measuring system that is capable of measuring a water level of each of surface water and groundwater to monitor interrelation therebetween.

Other objects unspecified in the present invention will be additionally considered within the range that can be easily inferred from the following detailed descriptions and effects thereof.

Embodiments of the present invention provide a sensor for measuring a water level of groundwater and surface water by using magnetostriction displacement, the sensor including: an outer case having a hollow space therein and extending in a longitudinal direction; a magnetostriction line spaced apart from an inner wall in the hollow space of the outer case to extend in the longitudinal direction; a floating permanent magnet guided along the magnetostriction line to be movable in the longitudinal direction, the floating permanent magnet being changed in position to correspond to a water level; and a transceiver applying a current pulse into the magnetostriction line to receive an elastic wave that is generated while first magnetic fields formed in a circumferential direction of the magnetostriction line by the current pulse crosses a second magnetic fields formed in an axial direction of the magnetostriction line by the permanent magnet.

In some embodiments, the outer case may include: an accommodation pipe for accommodating the magnetostriction line and the floating permanent magnet; and a tip portion disposed on a lower end of the accommodation pipe, the tip portion having a tapered shape that gradually decreases in diameter toward an end thereof.

In other embodiments, the outer case may include at least one water flowing hole through which the groundwater or the surface water is introduced into the outer case.

In still other embodiments, the outer case may include a position fixing permanent magnet fixed to the magnetostriction line on an end of the outer case.

In other embodiments of the present invention, a multi measurement system for measuring a water level of each of groundwater and surface water includes: a first water level measurement sensor, which is the water level measurement sensor for measuring the water level of the groundwater according to any one of claims 1 to 8, disposed to allow a first floating permanent magnet to float on a water surface of the groundwater; a second water level measurement sensor, which is the water level measurement sensor for measuring the water level of the surface water according to any one of claims 1 to 8, disposed to allow a second permanent magnet to float on a water surface of the surface water; a controller measuring an elastic wave reflected from the first floating permanent magnet to measure the water level of the groundwater and measuring an elastic wave reflected from the second floating permanent magnet to measure the water level of the surface water; and a monitoring server for monitoring water level data of the groundwater and surface water according to a predetermined cycle.

In some embodiments, a first tip portion disposed on an end of the first water level measurement sensor is fixed to a bottom surface of a stratum on which the groundwater flows, and a second tip portion disposed on an end of the second water level measurement sensor is fixed to a bottom surface of a stratum on which the surface water flows.

In other embodiments, each of the first and second water level measurement sensors has an outer case including at least one water flowing hole through which the groundwater or the surface water is introduced into the outer case.

In still other embodiments, the outer case of the first water level measurement sensor may include: an accommodation pipe for accommodating a magnetostriction line and a floating permanent magnet; and a tip portion disposed on a lower end of the accommodation pipe, the tip portion having a tapered shape that gradually decreases in diameter toward an end thereof.

In yet other embodiments, the lower end of the accommodation pipe or the tip portion may include at least one water flowing hole through which the groundwater is introduced into the outer case.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

The attached drawings are presented for purposes of explanation only, and the technical scope of the present invention is not limited thereto.

DETAILED DESCRIPTION OF PREFERRED EMBODIMENTS

Hereinafter, embodiments of the present invention will be described in detail with reference to the accompanying drawings. Moreover, detailed descriptions related to well-known functions or configurations will be ruled out in order not to unnecessarily obscure subject matters of the present invention.

Figure 1:
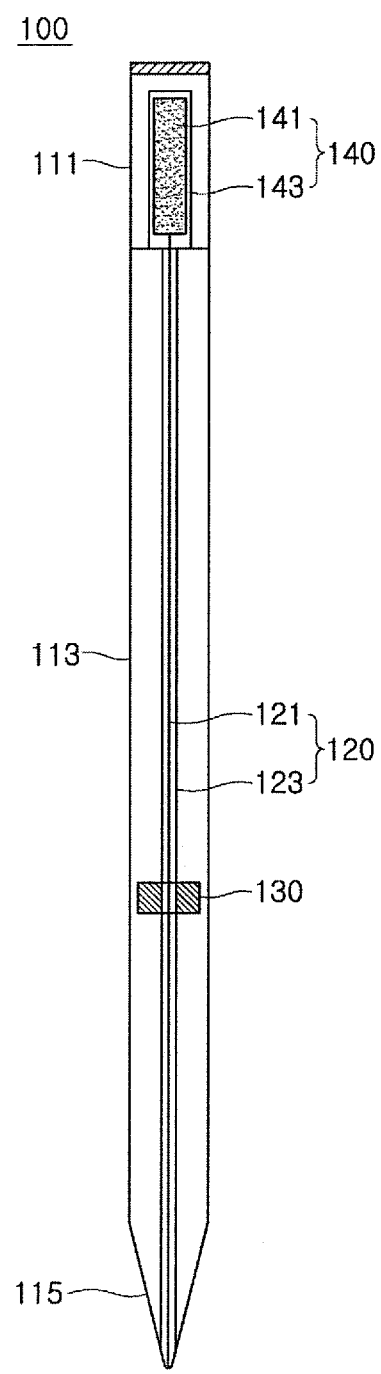
FIG. 1 is a schematic view illustrating a water level measurement sensor for groundwater and surface water using magnetostriction displacement according to an embodiment.

FIG. 1 is a schematic view illustrating a water level measurement sensor for groundwater and surface water using magnetostriction displacement according to an embodiment.

As illustrated in FIG. 1, a water level measurement sensor 100 for groundwater and surface water using magnetostriction displacement may include an outer case 110, a magnetostriction line 120, a floating permanent magnet 130, and a transceiver 140.

The outer case 110 has a pipe shape having a hollow space therein and extending in a longitudinal direction. The magnetostriction line 120 is disposed in a central portion of the outer case 110 in a longitudinal direction. The floating permanent magnet 130 is movably disposed along the magnetostriction line 120.

The outer case 110 may include an accommodation head 111, an accommodation pipe 113, and a tip portion 115. The accommodation head 111 may accommodate the transceiver 140 and be water-tightened to prevent moisture from being introduced from the outside. The accommodation pipe 113 may lengthily extend in a longitudinal direction and have the hollow space therein. The accommodation pipe 113 may have one end that is coupled to the accommodation head 111 and the other end that is coupled to the tip portion 115. Since the accommodation pipe 113 has a diameter greater than that of the floating permanent magnet 130, the floating permanent magnet 130 may move along the accommodation pipe 113 in a longitudinal direction. The tip portion 115 is disposed on a lower end of the accommodation pipe 113. The tip portion 115 has a tapered shape that gradually decreases in diameter toward an end thereof. The tip portion 115 has a wedged inclined surface so that the water level measurement sensor easily penetrates into a bottom surface such as a bottom surface of a stratum on which the stream flows or a bottom surface of a stratum on which the groundwater flows (hereinafter, referred to as a "bottom surface of the groundwater").

The magnetostriction line 120 may extend in the hollow space of the outer case 110 in a longitudinal direction and spaced apart from an inner wall of the outer case 110. The magnetostriction line 120 may include a steel wire 121 to which current is applied and a protection tube 123 that surrounds the steel wire 121. Although the steel wire 121 to which the current is applied actually functions as a factor that generates magnetostriction effect, in the present invention, the magnetostriction line 120 defined as a probe including the steel wire 121 and the protection tube 123.

The protection tube 123 is formed of a material that does not shield magnetic fields generated from the steel wire 121. The groundwater or surface water is introduced into outer case 110. Here, the floating permanent magnet 130 flows depending on a level of a water surface. Here, the protection tube 123 may function to prevent the current flowing in the steel wire 121 from being leaked into the groundwater or the surface water.

The floating permanent magnet 130 may be movable in a longitudinal direction by being guided along the magnetostriction line 120 and be changed in position to correspond to a water level by buoyancy. Thus, the floating permanent magnet 130 includes a permanent magnet and a buoyancy material providing buoyancy so that the permanent magnet floats on the water surface. In one embodiment, a through-hole is defined in a central portion of the floating permanent magnet 130 to allow the magnetostriction line 120 to pass through the through-hole. The through-hole has a diameter greater than that of the magnetostriction line 120 so that the floating permanent magnet 130 freely moves along the magnetostriction line 120.

The transceiver 140 applies a current pulse into the magnetostriction line 120. Here, first magnetic fields may be formed by the current pulse in a circumferential direction of the magnetostriction line 120, and second magnetic fields may be formed by the permanent magnet in an axial direction of the magnetostriction line 120. The transceiver 140 may receive an elastic wave generated while the first magnetic fields cross the second magnetic fields. The transceiver 140 may be disposed in the accommodation head 111 disposed on an upper end portion of the outer case. The transceiver 140 may include a transceiving circuit 141 and a circuit cover 143 for protecting the transceiving circuit 141 against the moisture.

Although not shown, the outer case may include a position fixing permanent magnet fixed to the magnetostriction line 120 on an end of the outer case. In the current embodiment, the position fixing permanent magnet may be fixed between the accommodation pipe 113 and the tip portion 115.

When position fixing permanent magnet is used in addition to the floating permanent magnet 130, an error due to change of an external environment factor (for example, a temperature) may be reduced. Hereinafter, a method of correcting the error will be described in detail.

Since the position fixing permanent magnet is fixed to the end of the magnetostriction line 120, an actual distance L between the position fixing permanent magnet and the transceiver 140 may be determined in advance. Also, through a detecting operation of the water level measurement sensor, a measurement distance value L' derived from propagation time of an ultrasonic wave between the transceiver 140 and the position fixing permanent magnet and a measurement distance value l' derived from propagation time of an ultrasonic wave between the transceiver 140 and the floating permanent magnet 130.

Through the measured distance values L' and l', a displacement value with respect to an object to be measured (hereinafter, referred to as a measurement object) of which a measurement error is corrected may be found through the following calculation method.

That is, the measurement distance value L' derived from the propagation time of the ultrasonic wave between the transceiver 140 and the position fixing permanent magnet may be divided by the actual distance value L between the transceiver 140 and the position fixing permanent magnet to calculate a reference position variation rate Y. Then, the reference position variation rate Y is reciprocally multiplied by the measured distance value l' derived from the propagation time of the ultrasonic wave between the transceiver 140 and the floating permanent magnet 130, i.e., a variation value l' with respect to the measurement object to calculate a variation value l' with respect to the error-corrected measurement object.

The mathematical formula may be expressed as follows.

$$Y = L' \div L$$

$$l = l' \times (l \div Y) \quad \text{(Mathematical formula 1)}$$

The variation value with respect to the measurement object of the water level measurement sensor may be compensated by using the mathematical formula 1 drawn as described above.

FIG. 2A is a schematic view illustrating a tip portion included in the water level measurement sensor for groundwater and surface water using magnetostriction displacement of a fluid storage tank according to an embodiment, and FIG. 2B is a view taken along line A-A' of FIG. 2A.

Figure 2:
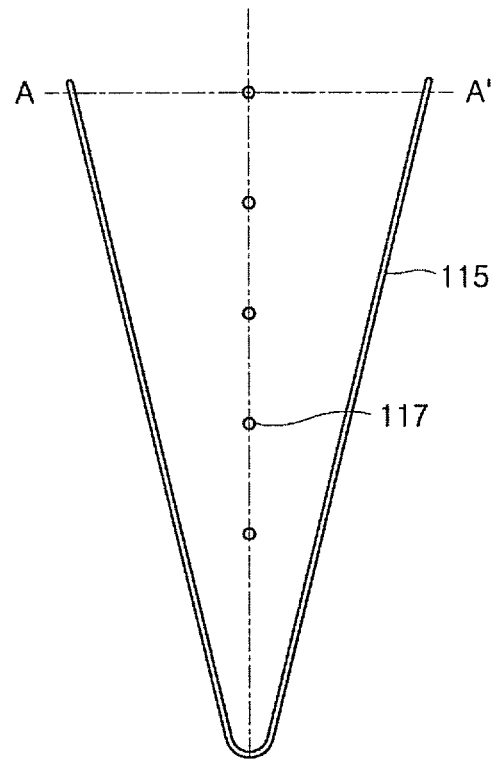
FIG. 2 is a schematic view illustrating a tip portion included in the water level measurement sensor for groundwater and surface water using magnetostriction displacement of a fluid storage tank according to an embodiment.
Figure 2:
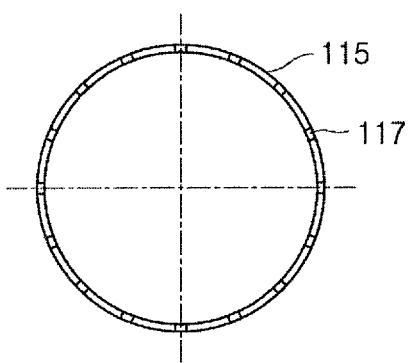

As illustrated in FIG. 2, the tip portion 115 may have the tapered shape that gradually decreases in diameter toward the end thereof and may include an inclined surface having a wedge shape.

The tip portion 115 may include at least one water flowing hole 117 through which the groundwater or the surface water is introduced into the outer case. As illustrated in FIG. 2A, the plurality of water flowing holes 117 may be spaced a predetermined distance apart from each other in a longitudinal direction. As illustrated in FIG. 2B, the water flowing holes 117 may be defined in a plurality of rows that are arranged in a longitudinal direction.

In another embodiment, the water flowing holes 117 may be defined in the accommodation pipe in the outer case. The water flowing holes 117 may be mainly defined in a lower end of the accommodation pipe so that the water flowing holes 117 are distributed on a position where a fluid pressure potential, i.e., a groundwater head and a surface water head are measured. Here, the water flowing holes may be uniformly distributed to interact with fluids in all directions. The number of water flowing holes may be inversely proportional to water permeability of peripheral geologic media. If the geologic media has sufficient water permeability, it is unnecessary to provide a lot of water flowing holes. However, the number of water flowing holes may increase in area such as a clay layer that has low water permeability. Also, although each of the water flowing holes has a size as small as possible so that the peripheral geologic media is not introduced and accumulated into the accommodation pipe, the water flowing hole has to have a size enough to introduce the peripheral fluids without being interrupted due to friction loss. Thus, the water flowing hole may have a size that is determined to proportional to a size of a peripheral unconsolidated material.

When the water flowing hole 117 is defined in an upper end of the accommodation pipe, the groundwater or the surface water may not be introduced into the outer case when the level of each of the fluids (the groundwater and the surface water) is lower than the upper end of the accommodation pipe. Also, when the water flowing hole 117 is not defined in the lower end of the accommodation pipe, the water introduced into the outer case is not discharged when the level of the water descends, and thus variation of the water level may not be measured.

When the groundwater or the surface water is introduced into the outer case through the water flowing hole 117, a water level in the outer case is the same as that at the outside of the outer case by fluid statics principles. Therefore, when a level in which the floating permanent magnet floats in the outer case is measured, the water level at the outside of the outer case may be found.

Figure 3:
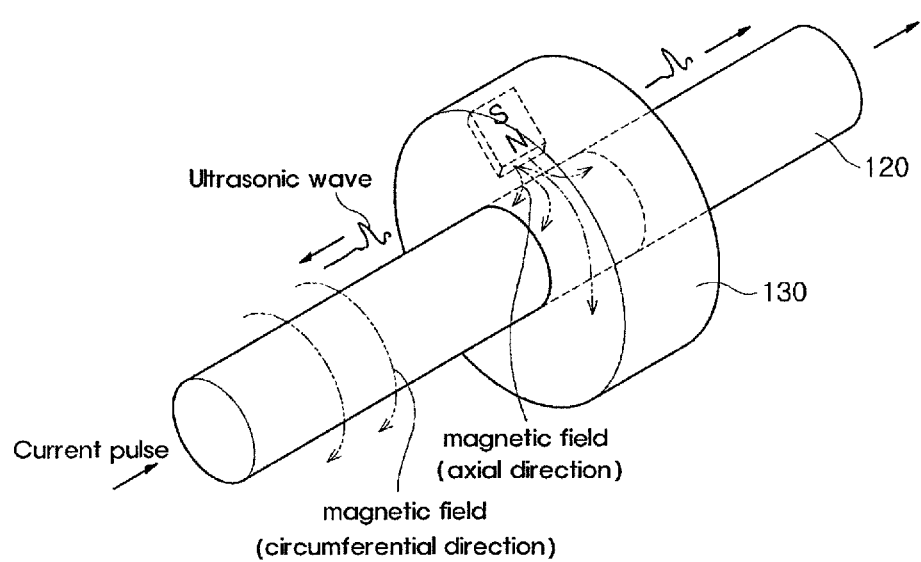
FIG. 3 is a schematic view illustrating an operation principle of the water level measurement sensor for groundwater and surface water using magnetostriction displacement according to an embodiment.
Figure 4:
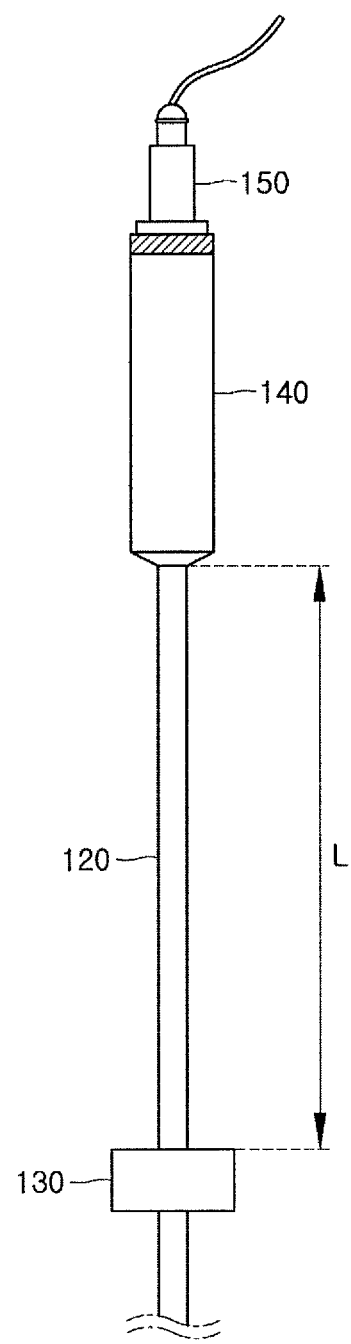
FIG. 4 is a view illustrating a method of measuring a water level by using the water level measurement sensor for groundwater and surface water using magnetostriction displacement.

FIG. 3 is a schematic view illustrating an operation principle of the water level measurement sensor for groundwater and surface water using magnetostriction displacement according to an embodiment, and FIG. 4 is a view illustrating a method of measuring a water level by using the water level measurement sensor for groundwater and surface water using magnetostriction displacement.

As illustrated in FIGS. 3 and 4, according to the present invention, the current pulse generated in the transceiver 140 generates the magnetic fields in the circumferential direction of the magnetostriction line 120. Also, the floating permanent magnet 130 vertically moving along the magnetostriction line 120 generates the magnetic fields in the axial direction of the magnetostriction line 120.

Thus, the magnetic fields in the circumferential direction that are generated from the magnetostriction line 120 may cross the magnetic fields in the axial direction that is generated from the floating permanent magnet 130 to induce combined magnetic fields (expressed by a hidden line). Here, the combined magnetic fields may be propagated to the magnetostriction line 120 as the ultrasonic wave (the elastic wave) that is a mechanical vibration wave, to generate distortion.

Thus, the sensor may have a structure as illustrated in FIG. 4 to measure the distance L between the transceiver 140 and the floating permanent magnet 130. That is, propagation time of the ultrasonic wave propagated along the magnetostriction line 120 at a supersonic speed, i.e., a time may be measured when the current pulse is applied from the transceiver 140 until a reflected wave is generated from the floating permanent magnet 130 returns to the transceiver 140. Here, when the measured time is calculated into a distance, the distance between the transceiver 140 and the floating permanent magnet 130 may be measured. Measured data may be transmitted to a controller through a cable 150. In one embodiment, the cable 150 may be a cable based on the communication standards such as RS-485.

Since the floating permanent magnet 130 floats according to the water level, the level of the groundwater or surface water may be measured from the distance between the transceiver 140 and the floating permanent magnet 130.

Figure 5:
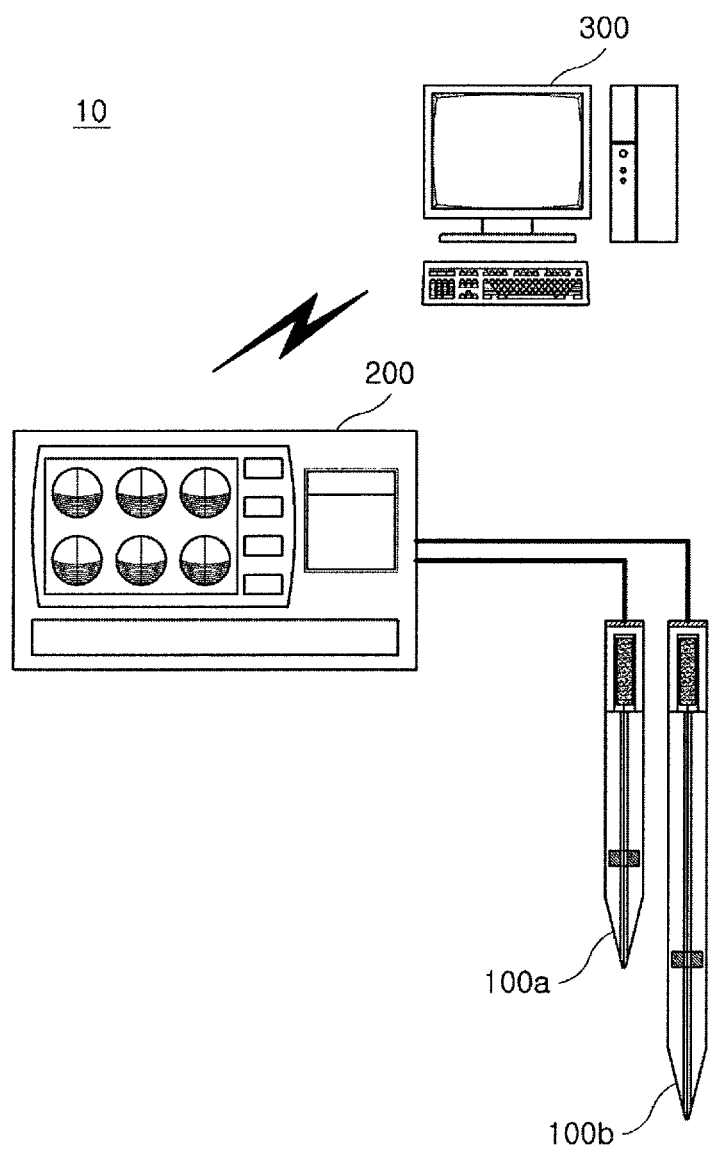
FIG. 5 is a schematic view illustrating a multi measurement system for the water level of each of the groundwater and the surface water using magnetostriction displacement according to an embodiment.

FIG. 5 is a schematic view illustrating a multi measurement system for the water level of each of the groundwater and the surface water using magnetostriction displacement according to an embodiment.

As illustrated in FIG. 5, the multi measurement system 10 according to the present invention includes a first water level measurement sensor 100a, a second water level measurement sensor 100b, a controller 200, and a monitoring server 300.

The first water level measurement sensor 100a corresponds to a water level measurement sensor for measuring the water level of the groundwater. The first water level measurement sensor 100a includes an outer case, a magnetostriction line disposed in a hollow space in the outer case in a longitudinal direction, and a first floating permanent magnet having buoyancy to float on the water surface of the groundwater. A first tip portion having a sharp shape may be disposed on an end of the first water level measurement sensor so that the first water level measurement sensor easily penetrates into a bottom surface of a stratum on which the surface water flows (hereinafter, referred to as a "bottom surface of the surface water").

A water flowing hole may be defined in the outer case of the first water level measurement sensor 100a so that the groundwater is introduced into the outer case. In one embodiment, since an upper end of the outer case of the first water level measurement sensor 100a is sunken in the surface water, when the water flowing hole is defined in the upper end of the outer case of the first water level measurement sensor 100a, the surface water may be introduced into the first water level measurement sensor 100a. Thus, the water level of the groundwater may not be accurately measured. Thus, the water flowing hole of the first water level measurement sensor 100a has to be defined in a lower end of the first tip portion so that a pressure potential of the groundwater fluid under the bottom surface of at least the surface water is measured.

The second water level measurement sensor 100b corresponds to a water level measurement sensor for measuring the water level of the surface water. The second water level measurement sensor 100b is disposed so that a second floating permanent magnet floats on the water surface of the surface water. A second tip portion defined in an end of the second water level measurement sensor 100b may be fixed to the bottom surface of the surface water. Since the surface water exists in a shallow position when compared to the groundwater, the second water level measurement sensor 100b may have a length that is less than that of the first water level measurement sensor 100a. Although the second water level measurement sensor 100b may have an outer case that is installed in the surface water in depth of about 1 m or less, the present invention is not limited thereto.

The controller 200 may measure an elastic wave reflected from the first floating permanent magnet to measure the water level of the groundwater and measure an elastic wave reflected from the second floating permanent magnet to measure the water level of the surface water. The controller 200 may provide user interface that displays the measured water level in graphic. For example, the measured water level may be displayed on a screen of the controller at about one minute intervals, the measured data is directly stored. The controller 200 may store the measured data for one year. An electric wire connecting the controller 200 to the sensor may be installed in a SUS protection tube. The SUS protection tube may be buried in a depth of about 0.5 to about 1 m under the ground so as to prevent the SUS protection from being lost.

The monitoring server 300 may monitor data of the water levels of the groundwater and surface water according to a predetermined cycle. The monitoring server 300 may be connected to the controller 200 in wireless and by an internet to receive the measured date of the controller 200. The monitoring server 300 may ring alarm when the groundwater or surface water is rapidly changed in water level or under a predetermined condition, e.g., when the maximum water level is imminent or the groundwater is in danger of being exhausted.

Figure 6:
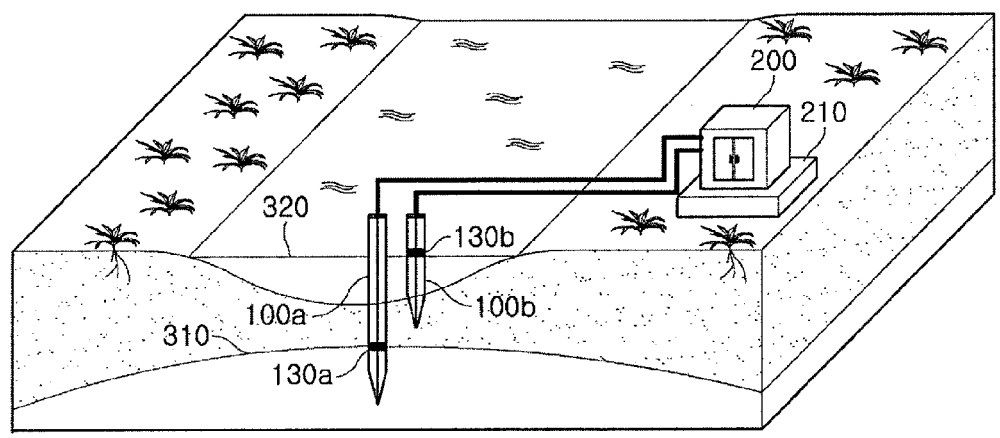
FIG. 6 is a schematic view illustrating an example in which the multi measurement system for the water level of each of the groundwater and the surface water using magnetostriction displacement is installed according to an embodiment.

FIG. 6 is a schematic view illustrating an example in which the multi measurement system for the water level of each of the groundwater and the surface water using magnetostriction displacement is installed according to an embodiment.

The first water level measurement sensor 100a corresponds to a water level measurement sensor for measuring the water level 310 of the groundwater. The first water measurement sensor 100a is installed so that the first floating permanent magnet 130a floats on the water surface 310 of the groundwater. In one embodiment, the first tip portion disposed on the end of the first water level measurement sensor 100a may be fixed to the bottom surface of the groundwater. Although the first water level measurement sensor 100a may be installed by constructing a 80 mm SUS outer case at a depth of about 3 m under the ground, the present invention is not limited thereto.

The second water level measurement sensor 100b corresponds to a water level measurement sensor for measuring the water level 320 of the surface water. The second water measurement sensor 100b is installed so that the second floating permanent magnet 130b floats on the water surface 320 of the surface water. The second tip portion defined in the end of the second water level measurement sensor 100b may be fixed to the bottom surface of the surface water. Since the surface water exists in a shallow position when compared to the groundwater, the second water level measurement sensor 100b may have a length that is less than that of the first water level measurement sensor 100a. Although the second water level measurement sensor 100b may have an outer case that is installed in the surface water in depth of about 1 m or less, the present invention is not limited thereto.

The controller 200 may measure the elastic wave reflected from the first floating permanent magnet 130a to measure the water level 310 of the groundwater and measure the elastic wave reflected from the second floating permanent magnet 130b to measure the water level 320 of the surface water. For example, the controller 200 may be disposed in a box that is formed of a steel sheet material having a thickness of about 2.0 T. Since the controller box is disposed outside, the controller box may be manufactured to endure various weathers and be fixed on a concrete support.

According to the present invention, the water level of the groundwater may be accurately measured as well as the surface water. In particular, although the groundwater flows under the surface water, the sensor may be installed to pass through the bottom surface of the surface water. The outer case of the sensor may have the pipe shape and thus be installed to pass through the bottom surface of the surface water. Since the floating permanent magnet freely moves within the pipe, the sensor may easily measure the water level of the groundwater. Since the groundwater is introduced into the outer case through the water flowing hole defined in the one end of the outer case, the water level of the groundwater may be accurately measured.

Also, according to the present invention, the sensor for measuring the water level of the surface water and the sensor for measuring the water level of the ground water may be installed at the same position to precisely grasp the interrelation between the surface water and the groundwater.

Also, according to the present invention, the water levels of the surface water and ground water may be simultaneously measured to monitor the interrelation between the surface water and the groundwater, thereby utilizing the monitored data for disaster prevention.

Even though effects are proposedly described herein, the effects describe in the following specification and their provisional effects, which are expected by technical features of the present invention, will be considered as if the effects are described in this specification.

The protection scope of the present invention is not limited to the description and the expression of explicitly explained examples above. Further, it will be understood that the protection scope of the present invention is not limited by obvious modifications or substitutions in the technical fields of the present invention.

What is claimed is:

1. A multi measurement system for measuring a water level of each of groundwater and surface water, the multi measurement system comprising:
   a first water level measurement sensor, which is a water level measurement sensor for measuring the water level of the groundwater, disposed to allow a first floating permanent magnet to float on a water surface of the groundwater;
   a second water level measurement sensor, which is the water level measurement sensor for measuring the water level of the surface water, disposed to allow a second permanent magnet to float on a water surface of the surface water;
   a controller measuring an elastic wave reflected from the first floating permanent magnet to measure the water level of the groundwater and measuring an elastic wave reflected from the second floating permanent magnet to measure the water level of the surface water; and
   a monitoring server for monitoring water level data of the groundwater and surface water according to a predetermined cycle, wherein the water level measurement sensor for measuring a water level of groundwater and surface water by using magnetostriction displacement, the water level measurement sensor comprising:
   an outer case having a hollow space therein and extending in a longitudinal direction;
   a magnetostriction line spaced apart from an inner wall in the hollow space of the outer case to extend in the longitudinal direction;
   a floating permanent magnet guided along the magnetostriction line to be movable in the longitudinal direction, the floating permanent magnet being changed in position to correspond to a water level; and
   a transceiver applying a current pulse into the magnetostriction line to receive an elastic wave that is generated while first magnetic fields formed in a circumferential direction of the magnetostriction line by the current pulse crosses a second magnetic fields formed in an axial direction of the magnetostriction line by the permanent magnet,
   wherein a first tip portion disposed on an end of the first water level measurement sensor is fixed to a bottom surface of a stratum on which the groundwater flows, and
   a second tip portion disposed on an end of the second water level measurement sensor is fixed to a bottom surface of a stratum on which the surface water flows.

2. The multi measurement system of claim 1, wherein each of the first and second water level measurement sensors has an outer case comprising at least one water flowing hole through which the groundwater or the surface water is introduced into the outer case.

3. The multi measurement system of claim 1, wherein the outer case of the first water level measurement sensor comprises:
   an accommodation pipe for accommodating a magnetostriction line and a floating permanent magnet; and
   a tip portion disposed on a lower end of the accommodation pipe, the tip portion having a tapered shape that gradually decreases in diameter toward an end thereof.

4. The multi measurement system of claim 3, wherein the lower end of the accommodation pipe or the tip portion comprises at least one water flowing hole through which the groundwater is introduced into the outer case.

* * * * *